(12) United States Patent
Gröeblacher et al.

(10) Patent No.: US 7,122,141 B2
(45) Date of Patent: Oct. 17, 2006

(54) METHOD AND SYSTEM FOR DUAL CO-EXTRUSION

(75) Inventors: Hans Gröeblacher, McPherson, KS (US); James W. Nixon, Salina, KS (US)

(73) Assignee: American Maplan Corporation, McPherson, KS (US)

( * ) Notice: Subject to any disclaimer, the term of this patent is extended or adjusted under 35 U.S.C. 154(b) by 0 days.

(21) Appl. No.: 10/911,332

(22) Filed: Aug. 4, 2004

(65) Prior Publication Data
US 2005/0006810 A1   Jan. 13, 2005

Related U.S. Application Data

(62) Division of application No. 10/002,400, filed on Oct. 23, 2001, now Pat. No. 6,793,474.

(60) Provisional application No. 60/267,987, filed on Feb. 9, 2001.

(51) Int. Cl.
*B29C 47/06* (2006.01)
(52) U.S. Cl. ............................ 264/171.26; 264/173.16
(58) Field of Classification Search ........... 264/173.16, 264/177.16, 173.12, 173.13; 425/131.1, 425/133.1
See application file for complete search history.

(56) References Cited

U.S. PATENT DOCUMENTS

| | | | |
|---|---|---|---|
| 2,952,873 A | 9/1960 | Porter | |
| 3,819,777 A | 6/1974 | Vermeerbergen | |
| 4,076,477 A | 2/1978 | Hacke | |
| 4,364,882 A | 12/1982 | Doucet | |
| 4,365,949 A | 12/1982 | Nash | |
| 4,708,615 A * | 11/1987 | Bethea et al. | 425/131.1 |
| 4,731,002 A | 3/1988 | Spence et al. | |
| 4,846,648 A | 7/1989 | Spence et al. | |
| 4,856,975 A | 8/1989 | Gearhart | |
| 4,954,061 A | 9/1990 | Repholz et al. | |
| 5,076,777 A | 12/1991 | Schmitt | |
| 5,106,562 A * | 4/1992 | Blemberg et al. | 264/173.13 |
| 5,143,677 A * | 9/1992 | Blemberg et al. | 264/171.27 |
| 5,190,711 A * | 3/1993 | Blemberg | 264/173.13 |
| 5,236,642 A * | 8/1993 | Blemberg et al. | 264/40.7 |
| 5,240,396 A | 8/1993 | Bremyer | |
| 5,518,036 A | 5/1996 | DeMasters et al. | |
| 5,616,350 A | 4/1997 | Wissmann et al. | |
| 5,705,111 A * | 1/1998 | Blemberg et al. | 264/173.13 |
| 5,711,349 A | 1/1998 | Wissmann | |
| 6,174,478 B1 | 1/2001 | Silver | |
| 6,413,595 B1 * | 7/2002 | Schirmer | 264/171.27 |
| 6,685,872 B1 * | 2/2004 | Dooley et al. | 264/514 |
| 6,769,899 B1 * | 8/2004 | Groeblacher et al. | 425/381 |
| 6,793,474 B1 * | 9/2004 | Groeblacher et al. | 425/131.1 |

* cited by examiner

*Primary Examiner*—Mark Eashoo
(74) *Attorney, Agent, or Firm*—Hamilton, Brook, Smith & Reynolds, P.C.

(57) ABSTRACT

In a co-extrusion system, a primary extruder is connected to a primary flow director to direct the solid melt from the primary extruder to the co-extrusion assembly. A secondary extruder is connected to a secondary flow director to direct the melt from the secondary extruder to the co-extrusion assembly. A co-extrusion assembly produces simultaneous co-extruded melts without any significant pressure change in the melt. Dies shape the co-extruded melts to a desired shape.

7 Claims, 9 Drawing Sheets

METHOD AND SYSTEM FOR DUAL CO-EXTRUSION

RELATED APPLICATION

This application is a divisional of U.S. application Ser. No. 10/002,400, filed Oct. 23, 2001 now U.S. Pat. No. 6,793,474, which claims the benefit of U.S. Provisional Application No. 60/267,987, filed on Feb. 9, 2001; the entire teachings of which are incorporated herein by reference.

BACKGROUND OF THE INVENTION

An extrusion such as extruded polyvinyl chloride (PVC) pipe is formed by feeding plastic into an extruder where it is subjected to high temperatures to create a molten substrate. The substrate then proceeds through a feed tube, at the end of which additional material known as capstock can be applied if desired. The process of adding additional material to the substrate is known as co-extrusion. The substrate and capstock are known as melt. The melt proceeds through an extrusion head, at the end of which the melt passes through a die. The die contains the circular cross-sectional profile shape to be extruded. The melt hardens as it exits the die in the desired cross-sectional form. The hardened material forms a tube that can grow to arbitrary length as additional melt is extruded.

Normally, PVC pipe is produced by extruding molten plastic through a single die of an extruder. In some cases, two PVC pipes are produced simultaneously by extruding molten plastic through a Y-block, a pair of extrusion heads and a pair of dies.

The ultimate shape of the extrusion is determined by a melt flow passage in the die between a bushing which surrounds a pin or mandrel. For circular pipe, the pin is circular in cross-section and an opening in the bushing which surrounds the pin is circular. To obtain a non-circular cross-section, such as a square, a circular extrusion is typically reshaped through a transition bushing and pin which are circular at the inlet and square, for example, at the outlet.

SUMMARY OF THE INVENTION

In accordance with the invention, there is provided a system and method for co-extruding two simultaneous melts. A co-extrusion system contains a primary extruder, a secondary extruder, a primary flow director, a secondary flow director, at least first and second co-extrusion assemblies and extrusion dies. The primary flow director divides the solid melt from the primary extruder into two symmetrical flow paths. The secondary flow director divides the melt from the secondary extruder into two symmetrical flow paths. The first and second co-extrusion assemblies co-extrude the melt simultaneously from the primary and secondary flow directors. The co-extrusion takes place ahead of the dies so that there is no substantial pressure change in the melt, thereby providing for consistent and uniform flow control. The dies receive the co-extruded melt from their respective co-extrusion assemblies.

The secondary flow director contains top and bottom plates, each of which have channels which form two symmetrical flow paths. Conduits extend from the bottom plate to feed the melt into the co-extrusion assemblies.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
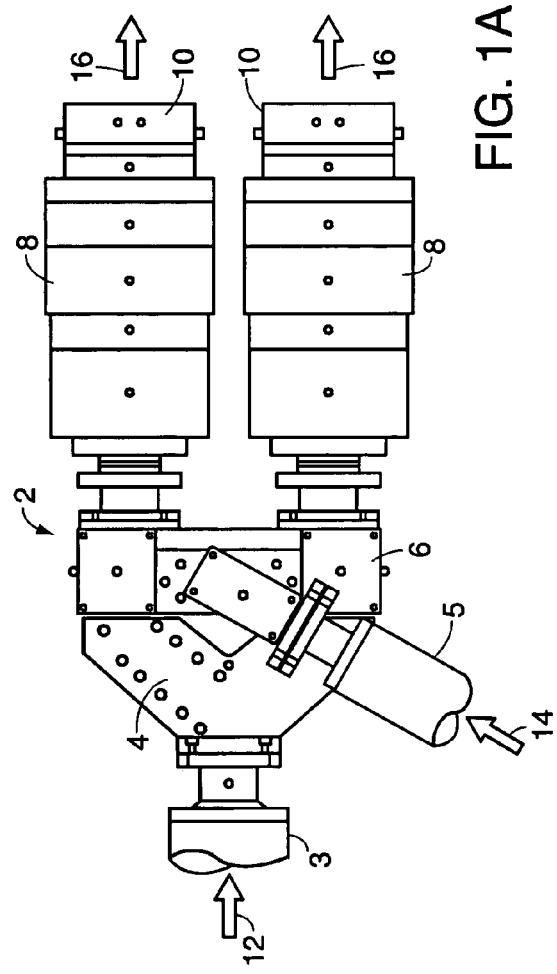
FIGS. 1A–C show plan, side and perspective views of a dual co-extrusion set-up.
Figure 1B:
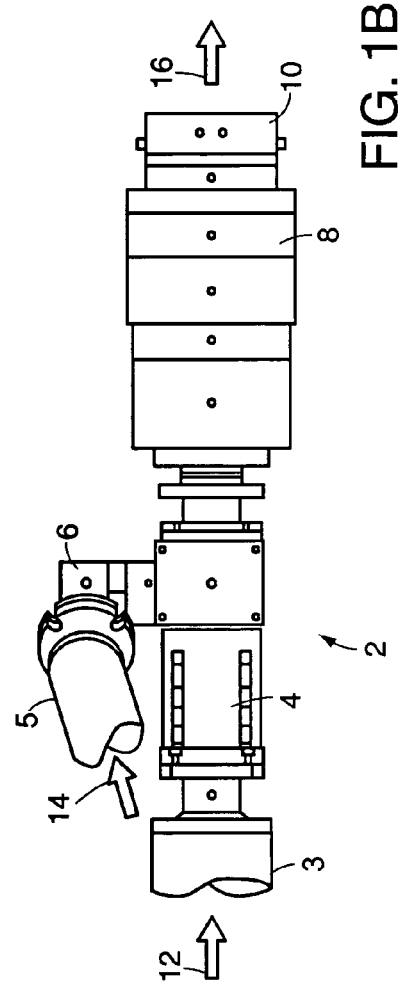
Figure 1C:
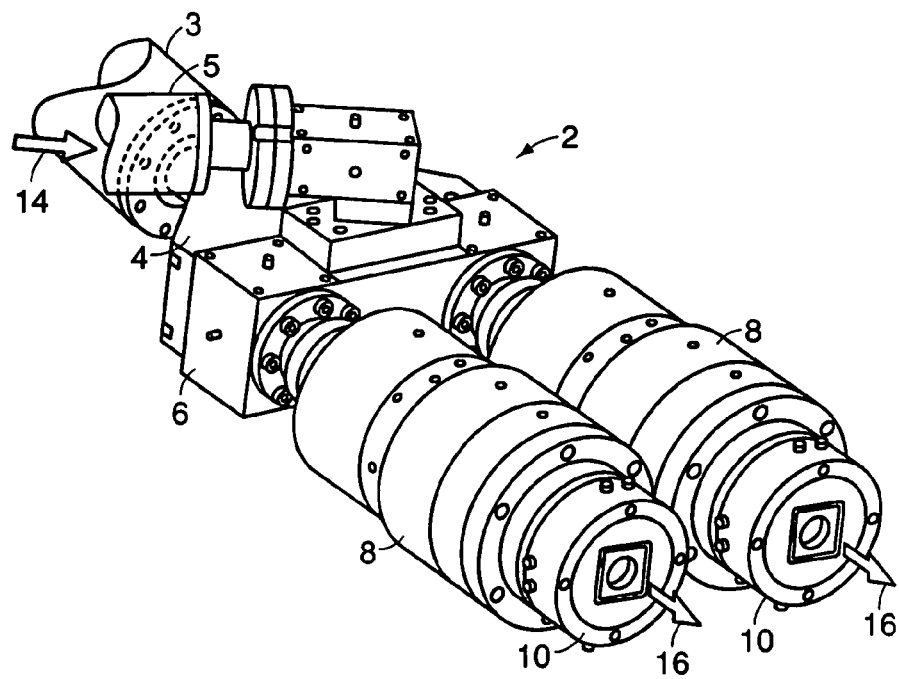

In the embodiment of FIGS. 1A–C, a dual co-extrusion setup 2 is used to extrude two simultaneous profiles (not shown) using one main extruder 3 and one co-extruder 5. The dual co-extrusion setup 2 comprises a "Y" adapter 4; dual-line co-extrusion assembly 6; two spider pipe heads 8; and two adjustable profile dies 10 and is shown assembled in FIGS. 1A–C. In the direction of flow path 12, the main extruder injects solid substrate into the "Y" adapter 4 which divides the substrate into two separate flows. In the direction of flow path 14, the co-extruder injects capstock (not shown) into the co-extrusion assembly 6. Inside a co-extrusion assembly 6, the capstock is divided into separate flows and the capstock and substrate of each flow are bonded together to form two separate flows of capstock coated substrate (CCS). Each flow of CCS flows from the co-extrusion assembly 6 into a separate spider pipe head 8 and into a respective adjustable profile die 10. The CCS enters the two (2) adjustable profile dies 10 in circular form and each adjustable profile die transforms the CCS into a desired cross-sectional profile. The extrusions exit the two adjustable profile dies 10 simultaneously in the direction of flow path 16.

The adjustable profile dies are described in detail in application Ser. No. 09/912,250 filed Jul. 24, 2001, now U.S. Pat. No. 6,769,899 which is incorporated by reference in its entirety.

Figure 2A:
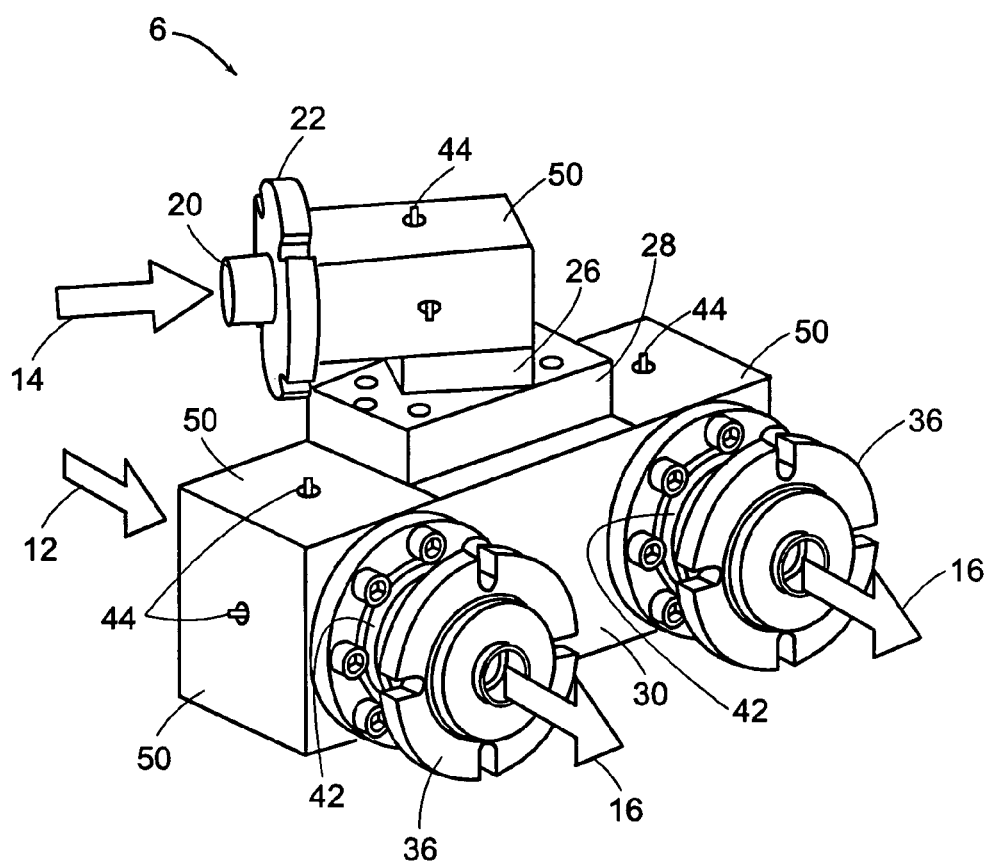
FIGS. 2A–B show assembled and exploded views of a co-extrusion assembly.

FIGS. 2A and B show the components of the co-extrusion assembly 6. In one embodiment of the invention, the co-extrusion assembly 6 can be made of stainless steel or another material used in the industry. The co-extrusion assembly 6 comprises the following components: capstock flow insert 20; adapter flange 22; horizontal plate 24; vertical plate 26; plate-to-block adapter 28; dual coex block 30; locating insert 32; co-extrusion pin 34; dual coex bushing 36; main flow insert 38; heat bands 42; heat plate covers 50; and thermal sensors 44.

To avoid redundancy, one half of the system will be described since the second half is a mirror image of the first.

Figure 2B:
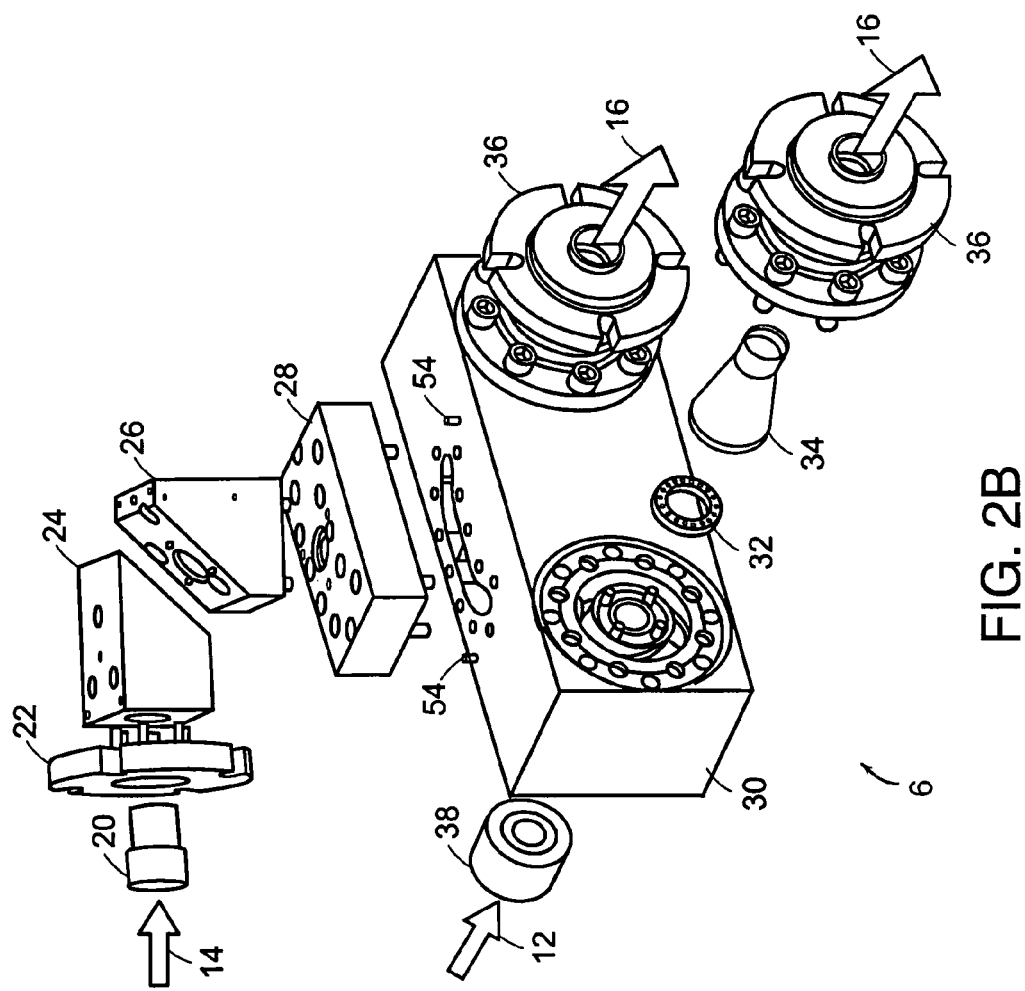
Figure 3:
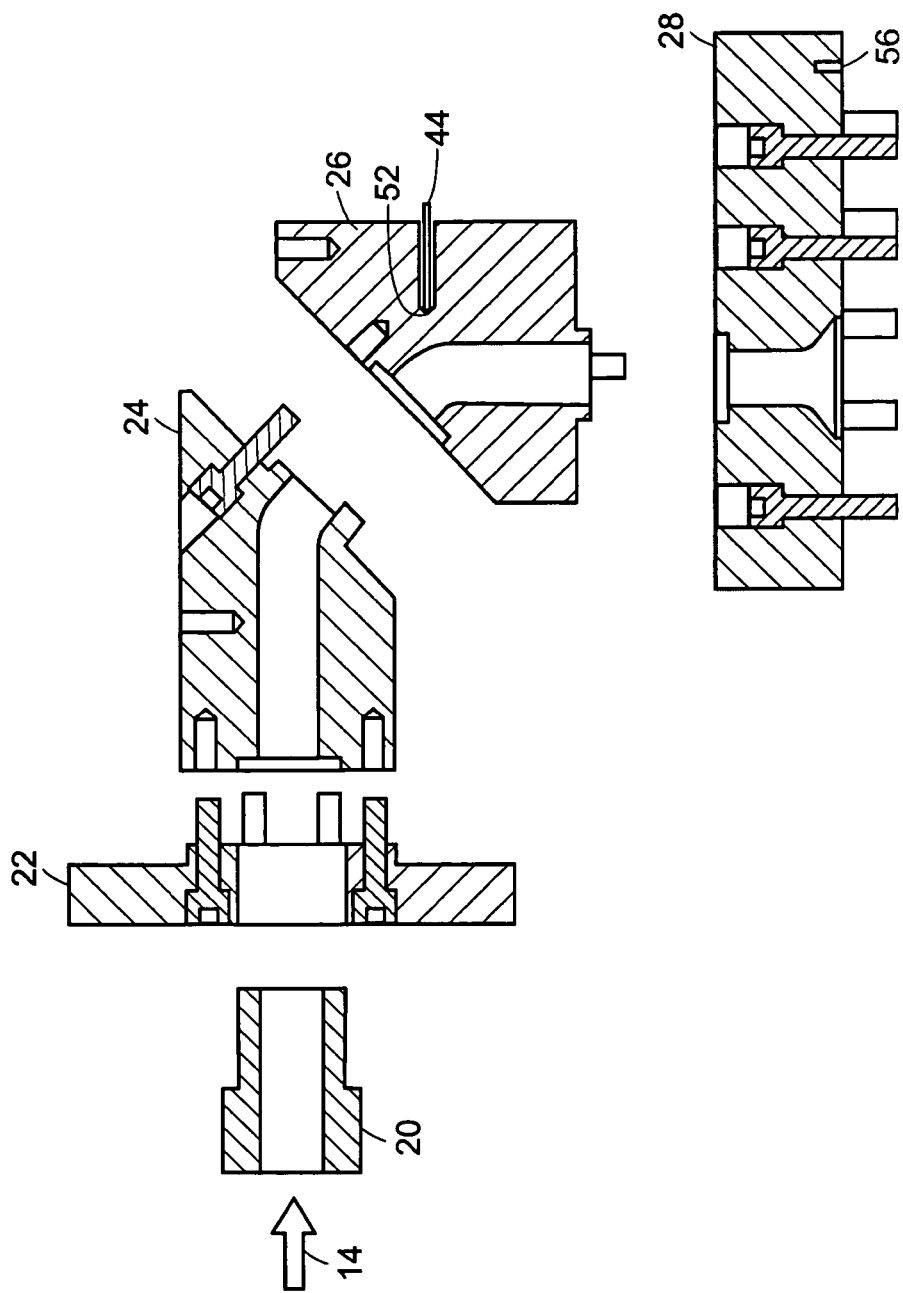
FIG. 3 shows a cross-sectional view of the capstock insert, adapter flange, horizontal plate, vertical plate and plate-to-block adapter.
Figure 4A:
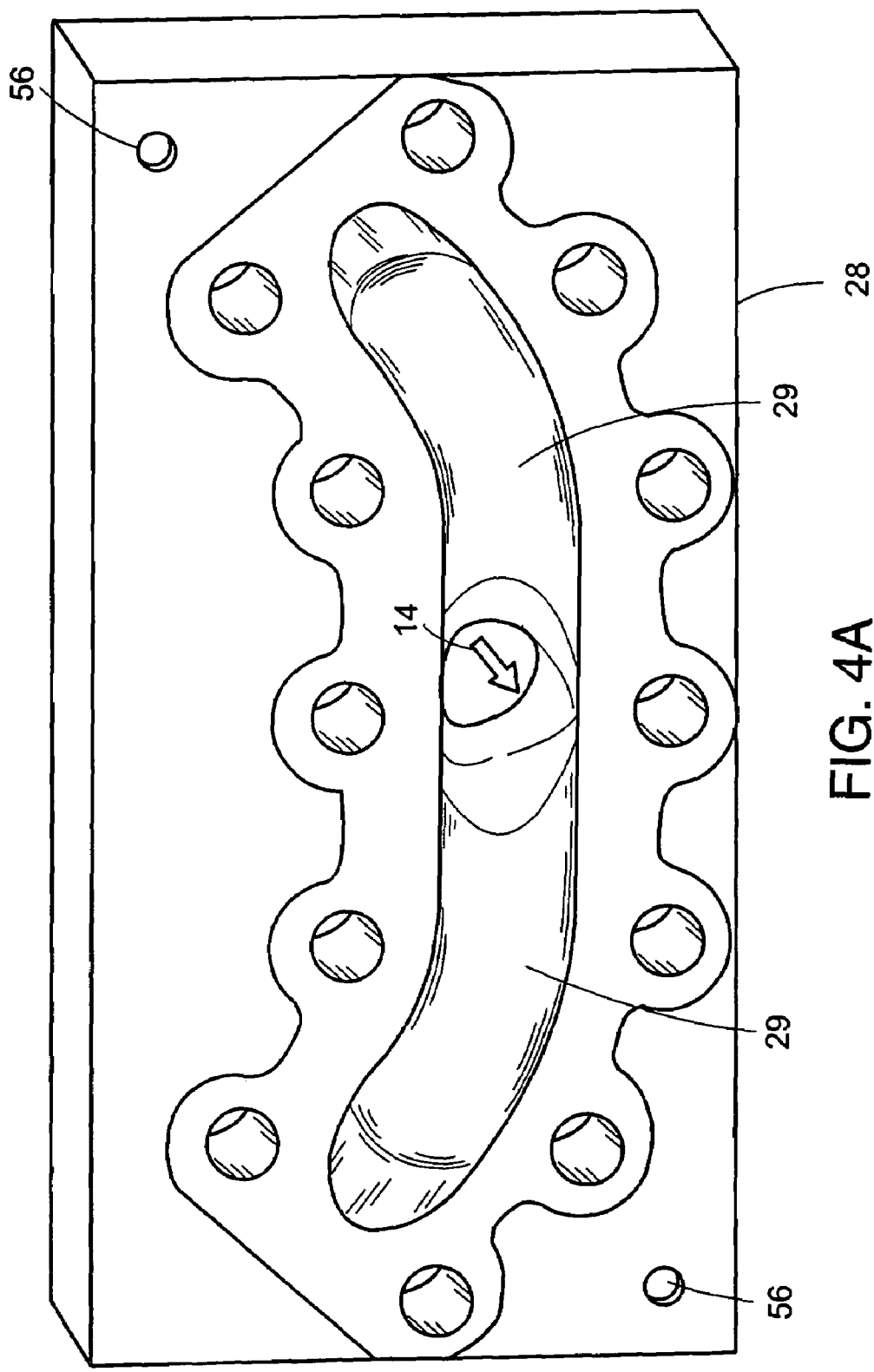
FIGS. 4A–B show bottom and cross-sectional views of the plate-to-block assembly.
Figure 4B:
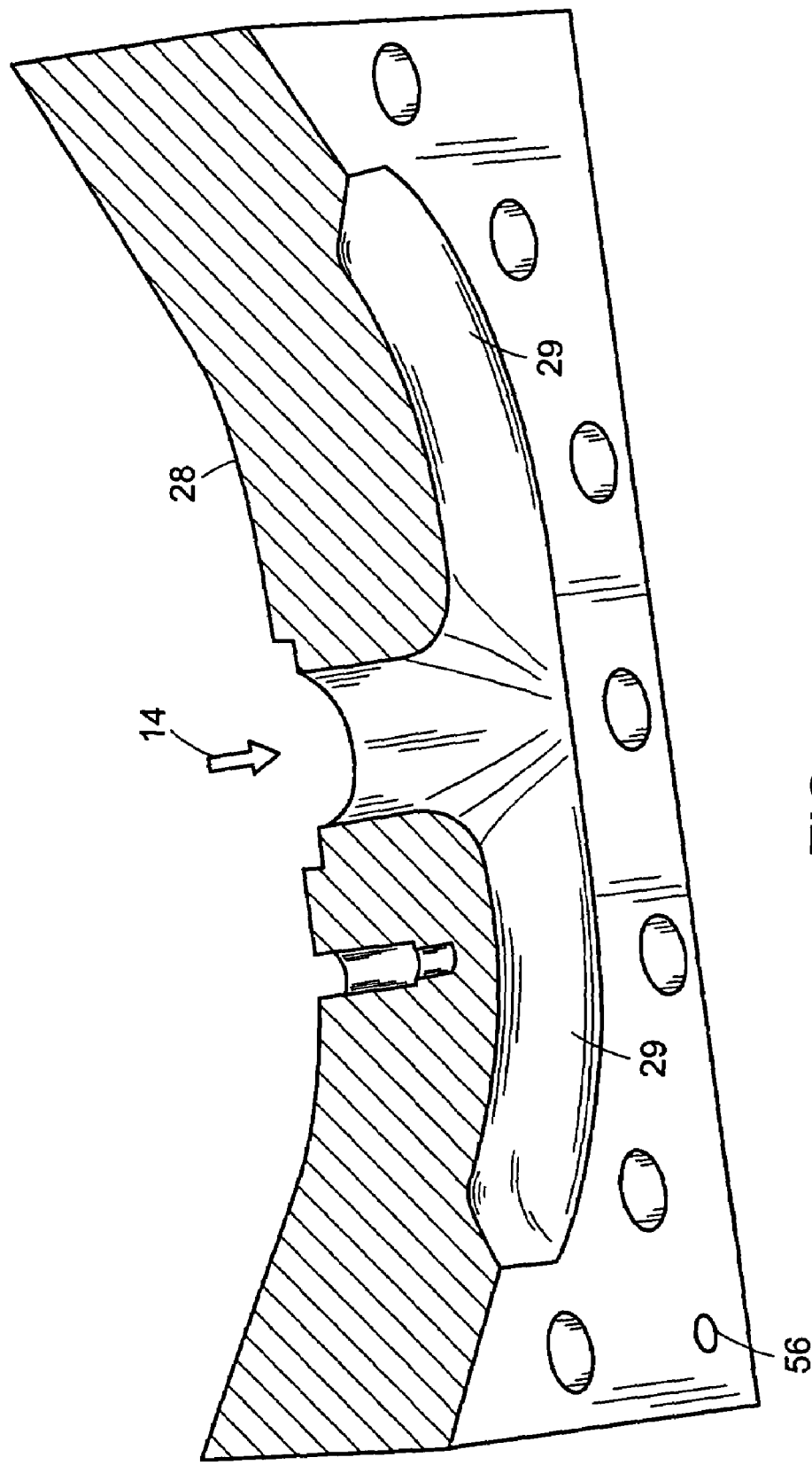
Figure 5A:
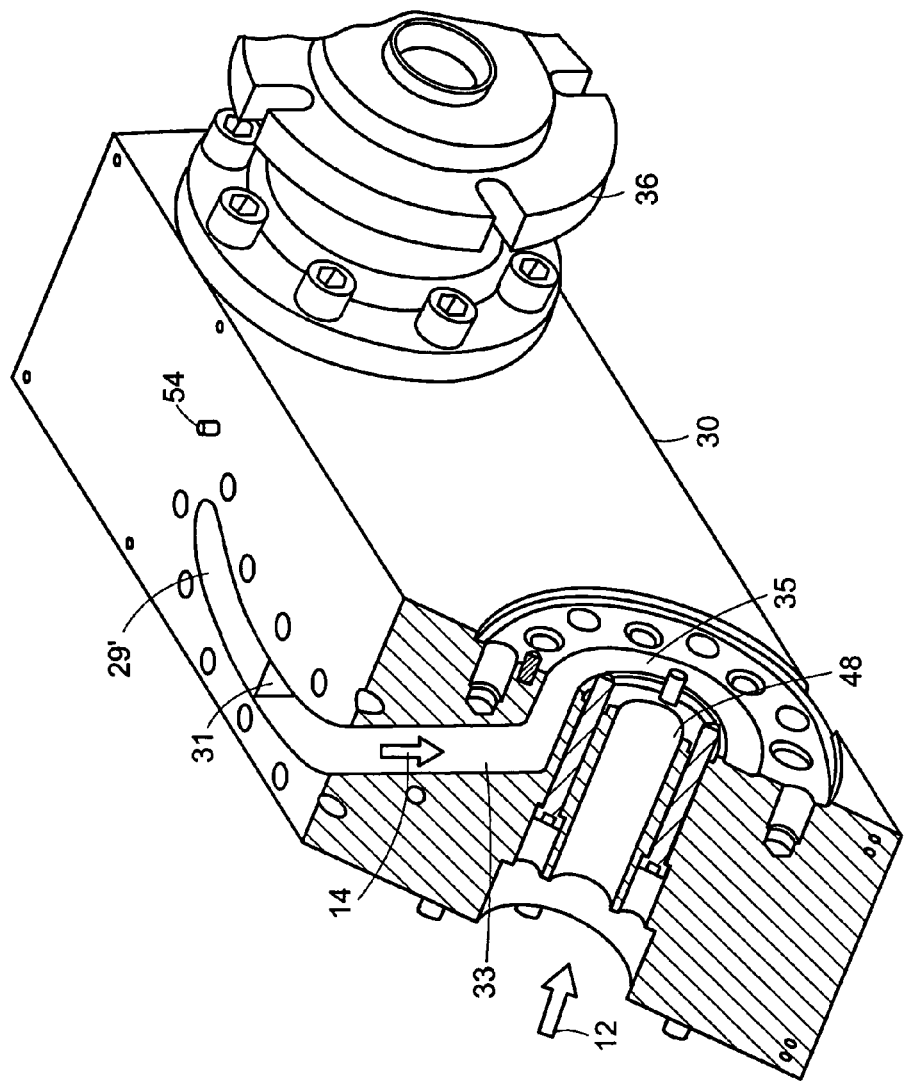
FIGS. 5A–B show cross-sectional views of one half of the dual coex block.
Figure 5B:
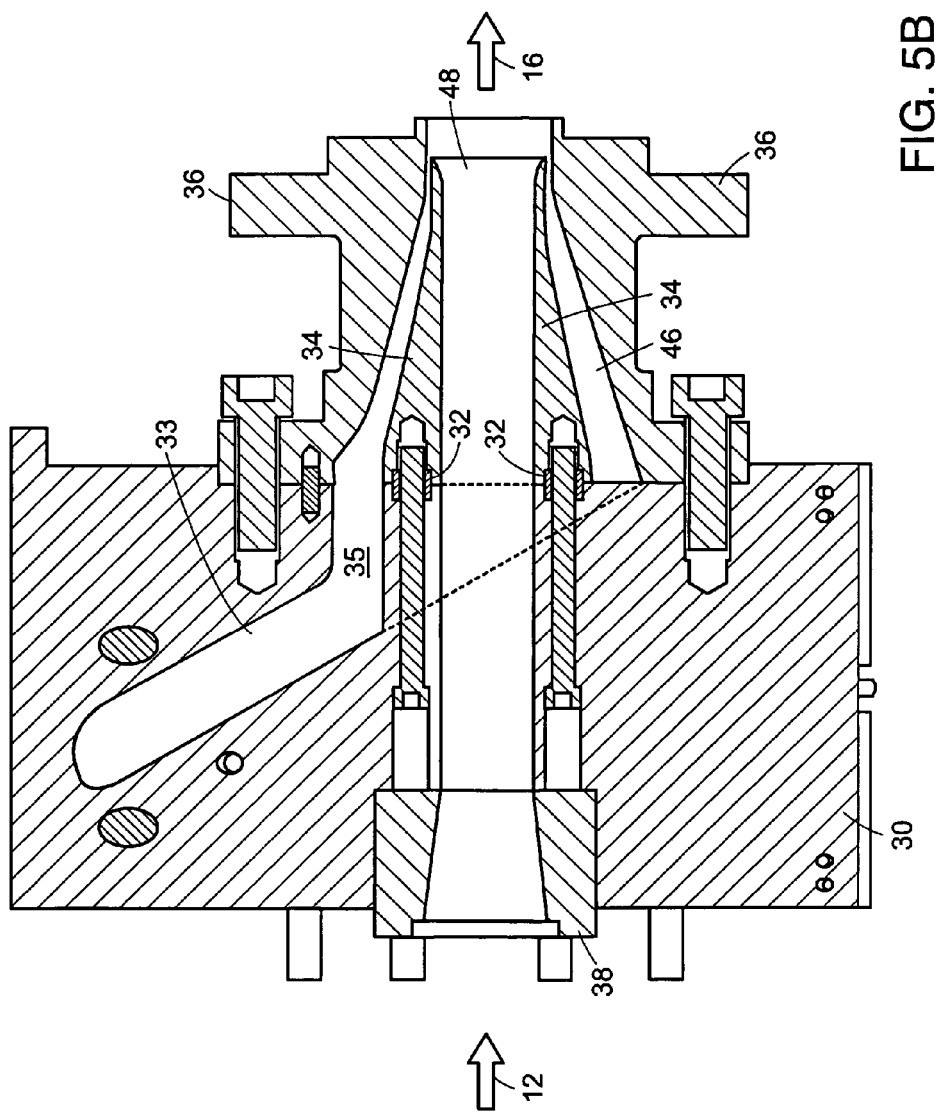
Figure 6:
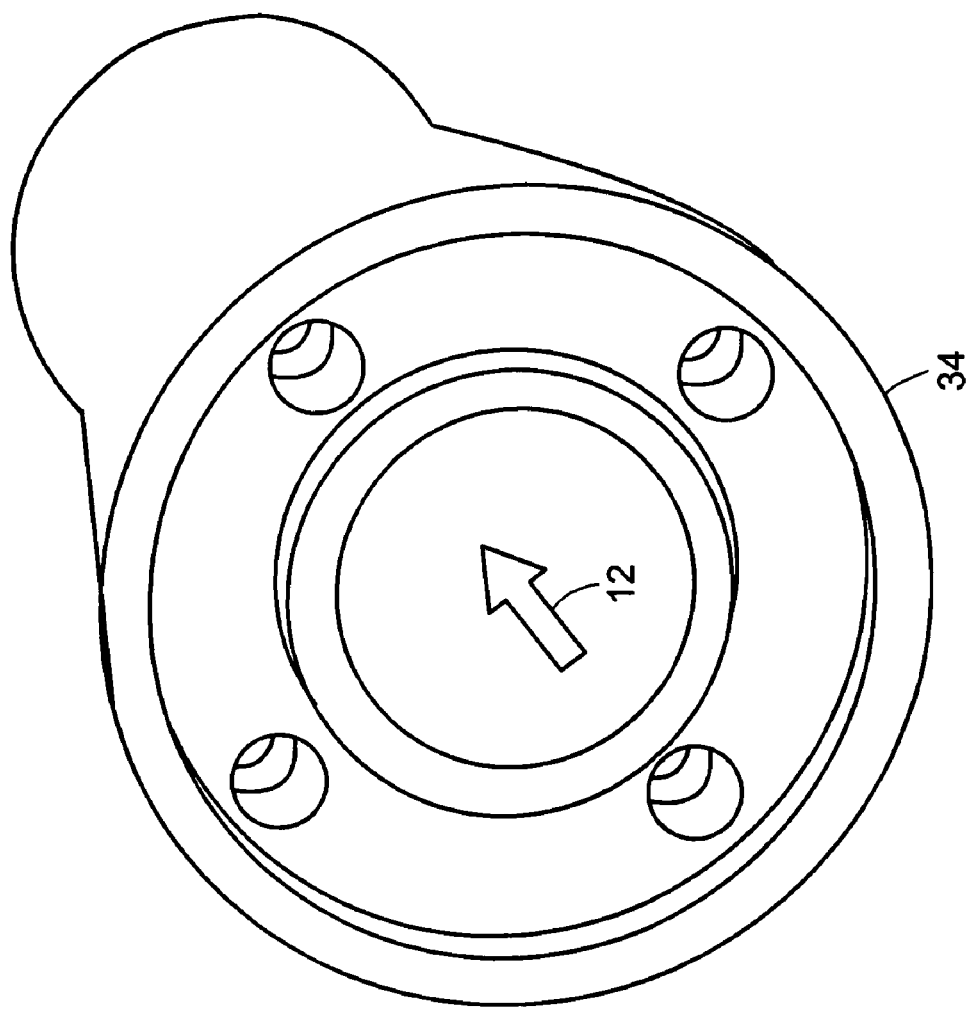
FIG. 6 shows a perspective view of a co-extrusion pin.

Solid substrate flows from the "Y" adapter 4 through the main flow chamber 48 (FIG. 5A) of the dual coex block 30. As shown in FIGS. 2B and 3, the capstock flows from adapter flange 22 through horizontal plate 24, vertical plate 26 and plate-to-block adapter 28. As shown in FIGS. 4A, 4B and 5A, the capstock is divided into two symmetrical flow paths by capstock divider 31 and facing channels 29 and 29' in the plate-to-block adapter 28 and dual coex block 30 respectively. The plate-to-block adapter 28 is curved to allow for continuous flow of the capstock through the divider without hitting an edge and burning the melt. The capstock then flows through the dual coex block 30 at coat hanger neck 33 (FIG. 5A) at least at a 30 degree angle to allow the capstock to flow continuously into the coat hanger 35. In one embodiment, a 45 degree angle is used to minimize the length of the flow channel reducing resonant time through the co-extrusion setup 2. The coat hanger 35 is tapered where a proximal end connected to the coat hanger neck 33 is of greater axial length than its distal end. The capstock exits the coat hanger 35 and enters the capstock flow chamber 46 which is between the co-extrusion pin 34 and dual coex bushing 36. The capstock flow is restricted in the portion of the capstock flow chamber 46 connected to the proximal end of the coat hanger 35 to permit the capstock to flow symmetrically around the co-extrusion pin 34 reducing resonant time through the dual coex bushing 36. The solid substrate flows through the co-extrusion pin 34 at the same time the capstock flows around the co-extrusion pin 34. The capstock is applied to the exterior wall of the solid substrate at a distal end of the co-extrusion pin 34 and dual coex bushing 36. In other embodiments, the capstock can be applied to the interior of the solid substrate or to both the interior and exterior of the solid substrate.

Application of the capstock to the solid substrate before entering either the spider pipe head 8 or die 10 maintains uniform equilibrium pressure. The application of the capstock to a solid substrate results in an insignificant pressure drop because it occurs at a consistent high pressure of at least 1500 psi resulting in the CCS exiting the die at the same velocity.

The newly formed CCS then flows either into a spider pipe head or extrusion die. The spider pipe head 8 transforms the solid CCS into tubular form. The CCS enters the die 10 which further adjusts the shape of the extrusion. If a solid shape is preferred, the spider pipe head 8 may be removed from the co-extrusion setup 2.

The plate-to-block adapter 28 is aligned on the dual coex block 30 using alignment pins 54 and alignment holes 56. The plate-to-block adapter 28 is then bolted to the dual coex block 30 creating the capstock flow director. The vertical plate 26 is seated in and bolted to the plate-to-block adapter 28. The horizontal plate 24 seated in and bolted to the vertical plate 26. The adapter flange 22 blots to the horizontal plate 24 and the capstock insert 20 is seated in the adapter flange 22. The capstock insert 20 transitions the capstock flow from the co-extruder to the co-extrusion assembly 6. A locating insert 32 is fitted between the dual coex block 30 and co-extrusion pin 34 to ensure proper alignment of the co-extrusion pin 34 and the dual coex block 30. The co-extrusion pin is bolted to the dual coex block 30. The dual coex bushing 36 is seated over the co-extrusion pin 34 and bolted to the dual coex block 30. The dual coex bushing can further be coupled to a spider pipe head 8 or extrusion die 10. A main flow insert 38 is seated in the dual coex block 30 and transitions the main flow from the "Y" adapter 4 to the dual coex block 30.

Heat plates 40 and heat bands 42 are attached to the horizontal plate 24, vertical plate 26, dual coex block 30 and dual coex bushing 36 to maintain stable temperature of the capstock, solid substrate and CCS resulting in a consistent viscosity. The heat plates 40 are covered by heat plate covers 50. The heat plates 40 and heat bands 42 can be individually controlled to adjust viscosity of the flowing melt. Thermocouple holders 52 are bored throughout the dual co-extrusion assembly 6 so thermal sensors 44 can be inserted to sense the temperature of the capstock and solid substrate.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for simultaneously coating a primary flowing melt with a secondary flowing melt comprising the steps of:
    injecting the primary flowing web from a primary extruder into a primary flow director;
    injecting the secondary flowing melt from a secondary extruder into a secondary flow director;
    dividing the primary flowing melt into two flow paths in the primary flow director;
    dividing the secondary flowing melt into two flow paths in the secondary flow director;
    coating the primary flowing melt with the secondary flowing melt in an least first and second co-extrusion assembles with no substantial pressure change in the melts; and
    receiving flowing coated melt from the co-extrusion assemblies at respective dies.

2. The method of claim 1, wherein the primary flowing melt is of solid shape.

3. The method of claim 1, wherein the step of coating the primary flowing melt with the secondary flowing melt coats the exterior of the primary flowing melt.

4. A method for simultaneously coating a primary flowing melt with a secondary flowing melt comprising:
    injecting the primary flowing melt from a primary extruder into a primary flow director.
    injecting the secondary flowing melt from a secondary extruder into a secondary flow director;
    dividing the primary flowing melt into two flow paths in the primary flow director;
    dividing the secondary flowing melt into two flow paths in the secondary flow director;
    coating the primary flowing melt with the secondary flowing melt in at least first and second co-extrusion assemblies with no substantial pressure change in the melts;
    receiving flowing coated melt from the co-extrusion assemblies at respective spider pipe heads; and
    receiving the flowing coated melt from spider pipe heads at respective dies.

5. The method as claimed in claim 4, wherein the melt from the primary extractor is of solid shape.

6. A method for simultaneously coating a primary flowing melt with a secondary flowing melt comprising:
    injecting the primary flowing melt from a primary extruder into a primary flow director;
    injecting the secondary flowing melt from a secondary extruder into a secondary flow director;

dividing the primary flowing melt into two flow paths in the primary flow director;

dividing the secondary flowing melt into two flow paths in the secondary flow director;

coating the primary flowing melt with the secondary flowing melt in at least first and second co-extrusion assemblies with no substantial pressure change in the melts; and receiving flowing coated melt from the co-extrusion assemblies at respective spider pipe heads that transforms the melt from solid to tubular shape.

7. The method as claimed in claim 6, further comprising receiving the flowing melt from the spider pipe heads at respective adjustable dies.

* * * * *

UNITED STATES PATENT AND TRADEMARK OFFICE
CERTIFICATE OF CORRECTION

| | |
|---|---|
| PATENT NO. | : 7,122,141 B2 |
| APPLICATION NO. | : 10/911332 |
| DATED | : October 17, 2006 |
| INVENTOR(S) | : Hans Gröeblacher and James W. Nixon |

It is certified that error appears in the above-identified patent and that said Letters Patent is hereby corrected as shown below:

Claim 1, column 4, line 21, delete "web" and insert -- melt --
Claim 5, column 4, line 61, delete "extractor" and insert -- extruder --

Signed and Sealed this

Twenty-third Day of January, 2007

JON W. DUDAS
*Director of the United States Patent and Trademark Office*